United States Patent
Wolf

(10) Patent No.: US 10,164,550 B2
(45) Date of Patent: Dec. 25, 2018

(54) METHOD, CIRCUIT CONFIGURATION AND BRIDGE CIRCUIT FOR CHARGING A CAPACITANCE EFFECTIVE ON MAIN CURRENT TERMINALS OF SEMICONDUCTOR SWITCH

(75) Inventor: Harald Wolf, Ubstadt-Weiher (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 1046 days.

(21) Appl. No.: 13/054,477

(22) PCT Filed: Jun. 30, 2009

(86) PCT No.: PCT/EP2009/004697
§ 371 (c)(1),
(2), (4) Date: Jan. 14, 2011

(87) PCT Pub. No.: WO2010/006695
PCT Pub. Date: Jan. 21, 2010

(65) Prior Publication Data
US 2011/0116294 A1 May 19, 2011

(30) Foreign Application Priority Data
Jul. 14, 2008 (DE) .......................... 10 2008 032 876

(51) Int. Cl.
*H02M 3/335* (2006.01)
*H02M 7/521* (2006.01)
(52) U.S. Cl.
CPC .......... *H02M 7/521* (2013.01); *H02M 3/335* (2013.01)

(58) Field of Classification Search
USPC ............... 363/56.02, 84, 89–90, 97–98, 124, 363/131–133
See application file for complete search history.

(56) References Cited

U.S. PATENT DOCUMENTS

| 4,841,166 A | 6/1989 | Harnden | |
|---|---|---|---|
| 6,054,819 A * | 4/2000 | Pengov | ...................... 318/254.2 |
| 6,243,278 B1 * | 6/2001 | Jacobs | .......................... 363/127 |

(Continued)

FOREIGN PATENT DOCUMENTS

| EP | 0 901 212 | 3/1999 |
|---|---|---|
| JP | 61 269518 | 11/1986 |

(Continued)

OTHER PUBLICATIONS

International Search Report and Written Opinion, dated Oct. 27, 2009, issued in corresponding International Application No. PCT/EP2009/004697.

(Continued)

*Primary Examiner* — Jeffrey Gblende
(74) *Attorney, Agent, or Firm* — Hunton Andrews Kurth LLP

(57) ABSTRACT

A method, circuit configuration and bridge circuit for charging a capacitance effective on the main current terminals of a semiconductor switch, in particular an intrinsic capacitance, in particular the drain-source capacitance of a MOSFET semiconductor switch or the collector-emitter capacitance of an IGBT semiconductor switch, the precharging, in particular the at least partial charging, of the effective capacitance being forcibly controlled via a charging current path.

15 Claims, 4 Drawing Sheets

(56) References Cited

U.S. PATENT DOCUMENTS

| | | | |
|---|---|---|---|
| 6,268,758 B1 * | 7/2001 | Limmer et al. | 327/424 |
| 6,356,462 B1 * | 3/2002 | Jang et al. | 363/17 |
| 6,388,287 B2 | 5/2002 | Deboy et al. | |
| 6,483,678 B1 * | 11/2002 | Morita et al. | 361/2 |
| 7,518,256 B2 * | 4/2009 | Juanarena Saragueta et al. | 290/44 |
| 2005/0281057 A1 * | 12/2005 | Jung et al. | 363/15 |
| 2007/0035975 A1 * | 2/2007 | Dickerson et al. | 363/131 |
| 2008/0130334 A1 * | 6/2008 | Halberstadt | 363/123 |

FOREIGN PATENT DOCUMENTS

| | | |
|---|---|---|
| JP | 2001-358567 | 12/2001 |
| WO | 00/16407 | 3/2000 |

OTHER PUBLICATIONS

International Preliminary Report on Patentability, issued in corresponding International Application No. PCT/EP2009/004697.

* cited by examiner

METHOD, CIRCUIT CONFIGURATION AND BRIDGE CIRCUIT FOR CHARGING A CAPACITANCE EFFECTIVE ON MAIN CURRENT TERMINALS OF SEMICONDUCTOR SWITCH

FIELD OF THE INVENTION

The present invention relates to a method, a circuit configuration and a bridge circuit.

BACKGROUND INFORMATION

Circuit configurations in half-bridge circuit and full-bridge circuit are known for generating an alternating voltage from a direct voltage, which for example provide a potential-free direct voltage in switched-mode power supplies in combination with a downstream transformer having a rectifier.

Three-phase or multiphase bridge circuits are also known for generating a multiphase alternating voltage, as are provided for example in frequency converters for the variable rotational speed adjustment of alternating current motors. Such converters for supplying power to electric motors are known to supply power to each motor supply line via a half-bridge of semiconductor switches, the half-bridges being supplied from a unipolar voltage, the so-called intermediate circuit voltage. The intermediate circuit voltage is produced by a mains-fed rectifier or, when the electric motor is operated as a generator, by the electric motor itself, and reaches values of 500 volts and more.

The semiconductor switches in such configurations are operated in pulse-width modulated fashion. In the simplest case, the semiconductor switches are "hard-" switched. In the switching process, a current then simultaneously flows through the semiconductor switch, while a voltage drops on it as well. The semiconductor switch is so to speak operated in its active range for the duration of the switching process, which can result in significant switching losses.

The magnitude of the switching losses is also influenced by the behavior of free-wheeling diodes provided in the half-bridges in parallel to the semiconductor switches. In MOSFET semiconductor switches, these diodes are intrinsically present and have great reverse currents and a correspondingly high reverse current chopping such that in systems that use these intrinsic diodes as free-wheeling diodes, high switching losses and transient overvoltages on the semiconductor switches occur.

In so-called DC-DC converters, as described, for example, in U.S. Pat. No. 6,356,462, resonant technologies are used, which allow for a switching at zero voltage, which may be called ZERO VOLTAGE SWITCHING, or at zero current, which may be called ZERO CURRENT SWITCHING. The multitude of specific embodiments may be grouped into resonance converters and quasi resonance converters, where in the quasi resonance converter, in which a soft switching may be performed, the resonance is essentially manifested only for the period of the switching process. Compared to the hard-switched converters, a higher switching expenditure is required in the resonance converters. Moreover, the respective circuit topology must be taken into account in the design, particularly also that of the connected load. Often restrictions apply regarding the control methods.

PCT International Published Patent Application No. WO 00/16407 describes a special semiconductor switch, the drain-source capacitance of which is extremely voltage-dependent. At voltages lower than approximately 10% of the operational switching voltage, the drain-source capacitance has a very high value, which, however, with a rising voltage quickly diminishes to a very low value. With this property it is possible to achieve a low-loss switch-off since the current very quickly turns from the channel current to the charging current of the drain-source capacitance.

U.S. Pat. No. 4,841,166 describes a gate control circuit for reducing overvoltages when using MOSFET semiconductor switches and their intrinsic diodes as free-wheeling diodes. In this instance, when switching on a transistor, the current through the source terminal is detected and, if necessary, the switching process is slowed down by reducing the gate voltage such that the reverse current through the free-wheeling diode and the resulting overvoltage are limited. However, the switch-on losses are increased compared to a circuit design having a fast recovery diode instead of the intrinsic diodes of the MOSFET semiconductor switches. This document cites as related art a circuit configuration in which the one first diode optimized for switching applications is connected as a free-wheeling diode antiparallel to the series connection of a MOSFET semiconductor switch with a second diode. The second diode has the effect that the free-wheeling current necessarily flows via the optimized free-wheeling diode and not via the intrinsic diode.

SUMMARY

Example embodiments of the present invention improve the utilization of semiconductor switches.

Among features of example embodiments of the present invention in terms of the method are that it is provided for charging a capacitance effective on the main current terminals of a semiconductor switch, in particular an intrinsic capacitance, the electrical precharging, in particular the at least partial charging, of the effective capacitance being forcibly controlled via a charging current path.

Forcibly in this connection means that the charging is forced independently of the operating conditions of the semiconductor switch, that is, in particular independently of the load current.

According to example embodiments of the present invention, the semiconductor switch has one control terminal and two main current terminals, between which an effective capacitance is disposed. Thus a MOSFET semiconductor switch or an IGBT semiconductor switch may be used as the semiconductor switch. The capacitance effective may therefore be accordingly provided as a drain-source capacitance or as a collector-emitter capacitance or as a capacitor disposed in parallel.

It is advantageous for this purpose that the reverse voltage load on the semiconductor switch is reduced without an increase in the switching losses. It is not necessary to take into account the power semiconductor topology and the pulse method for controlling the semiconductor switch, in particular in circuits having upper and lower switches such as, for example, bridge-circuits having a pulse-width modulated control. Example embodiments of the present invention may be used directly in switches of a hard-switching power semiconductor system and requires no significant inductances or capacitances in the load current circuit.

Thus it is an advantageous aspect of example embodiments of the present invention that overvoltages on quickly switching semiconductor switches such as MOSFET semiconductor switches and IGBT semiconductor switches are reduced without increasing the switching losses.

In example embodiments of the present invention, after switching off a semiconductor switch, an additional circuit brings about a forced charging of its drain-source capacitance or collector-emitter capacitance before, after an in any case existing dead time, a possibly existing opposite semiconductor switch is switched on. To this end, a diode may be disposed in series with respect to the semiconductor switch, the reverse voltage of which is dimensioned in accordance with the specified charging level. Free-wheeling diodes in bridge circuits are then disposed antiparallel to this series circuit made up of the semiconductor switch and the diode. This configuration makes it possible to charge the drain-source capacitance, in particular even when the current is conducted by the parallel free-wheeling diode.

A further advantage of example embodiments of the present invention is that very high overvoltages are prevented in a voltage-dependent drain-source capacitance since the capacitance is prechargeable before the load current in the half-bridge system commutates when the opposite semiconductor switch is switched on. The unavoidable leakage inductance of the electrical connecting lines within one bridge branch forms a series resonant circuit together with the drain-source capacitance. The latter is connected to a direct voltage, namely, the intermediate circuit voltage. Without the precharging, the voltage on the capacitance would thus swing up to twice the value of the intermediate circuit voltage if the capacitance can be assumed as constant and no attenuation is taken into account. If the drain-source capacitance, however, decreases greatly with rising voltage, then the voltage may even overawing to many times the applied direct voltage. Due to the high capacitance at a low voltage and without the precharging, the voltage would initially rise very slowly and thus a high current would build up in the leakage inductance. The energy stored in the leakage inductance would subsequently have to be restored in a decreasing capacitance, which would cause an accordingly increased overvoltage on the drain-source capacitance. Using the precharging of the effective capacitance, the described upswing of the voltage and thus a respective overvoltage is preventable.

The effective capacitance may be implemented either as an intrinsic capacitance of the semiconductor switch or as a parallel circuit of the intrinsic capacitance of the semiconductor switch and a capacitor.

In example embodiments, the precharging, in particular the at least partial charging of the effective capacitance is forcibly controlled by the control signal of the semiconductor switch via the charging current path. The control signal for the additional charging circuit is thus obtained from the control signals of the semiconductor switches. The charge circuit thus needs no additional electrical isolation for signal routing. Only few components, in particular of low power, are required, and thus example embodiments of the present invention may be implemented simply and cost-effectively.

In example embodiments, the semiconductor switch includes a control electrode, that is, a control terminal, and two additional electrodes, that is, the main current terminals, the effective capacitance being disposed between the additional electrodes. It is advantageous in this connection that the intrinsic capacitance, which often causes interference in switches, no longer has an interfering effect due to the precharging.

In example embodiments, the charging current path is distinct from the main current path, in particular the one that conducts the power current to be switched. The advantage in this regard is that even in the event of a vanishing current in the main current path, the charging current path is operable independently, in particular capable of being coupled with the control path.

In example embodiments, the charging current path includes an inductance. The advantage in this regard is that this inductance together with the effective capacitance forms a series resonant circuit such that it is possible to implement a precharging to a higher voltage level than what the supply voltage provides, because an overswinging of the resonant circuit is utilized.

In example embodiments, the charging current path is supplied from the same voltage source, from which a driver circuit for producing the control current for the control terminal of the semiconductor switch is supplied as well, in particular the voltage source being electrically isolated from a signal electronics of a converter. The advantage in this regard is that no additional voltage source is required, but that rather the supply voltage of a driver or amplifier is usable as the voltage source for the charging current path for example, the driver or amplifier generating the energy of the control signal and itself being supplied via an electrical isolation. The control information is transmitted to the driver or amplifier by an upstream control electronics.

In example embodiments, another control semiconductor switch is provided in the charging current path. The advantage in this regard is that the current in the charging current path is controllable. In particular, the additional control semiconductor switch is controllable from the control path for the semiconductor switch of the main current path such that a forcible control of the charging current path is implementable.

In example embodiments, the semiconductor switch is situated in a bridge branch of a bridge circuit. It is advantageous in this regard that it is possible to implement a bridge circuit using the precharging, in particular also an output stage of an inverter, a mains feed-in unit of a solar power plant or the like.

In example embodiments, the voltage achieved on the effective capacitance by precharging reaches less than 30%, in particular less than 15%, of the voltage to be switched. The advantage in this regard is that already such a low precharge reduces the occurring overvoltages. This is achievable in that a voltage-dependent is used as the effective capacitance.

In example embodiments, the precharging is substantially performed during the dead time, that is, in particular during the period in which both semiconductor switches of a half-bridge of the bridge circuit are switched off. The advantage in this regard is that the dead time is utilized and that by the end of the dead time the effective capacitance is charged to the specified precharge voltage, whereby the overvoltages may be reduced.

In example embodiments, the inductance of the charging current path and thus of the series resonant circuit composed of the inductance and the effective capacitance is dimensioned such that the period duration of the resonant circuit is shorter than the dead time. Thus the maximum upswing of the voltage is reached within the dead time.

In example embodiments, a charging current is already built up in the charging current path, while the semiconductor switch to be switched off is still in the conductive state. When using an inductance in the charging current path, an even higher voltage is achievable if the charging current is built up already prior to the start of the dead time by switching on the control semiconductor switch.

Among features in the circuit configuration are that it includes a semiconductor switch, the semiconductor switch including a capacitance effective on the main current terminals of a semiconductor switch, in particular an intrinsic capacitance, in particular a drain-source capacitance of a MOSFET semiconductor switch or a collector-emitter capacitance of an IGBT semiconductor switch, a charging current path, in particular one via which the precharging is forcibly controlled, being provided for precharging, in particular for the at least partial charging, of the effective capacitance.

The advantage in this regard is that the forcibly occurring precharging is achievable without software, but rather using only a suitable configuration of components, and thus the overvoltages are reduced.

In example embodiments, the effective capacitance is arranged such that its capacitance diminishes with increasing voltage, in particular that even its change in capacitance diminishes per voltage increase, that is, that its capacitance diminishes disproportionally with increasing voltage. In example embodiments, semiconductor switches are used, the drain-source capacitance of which diminishes greatly with increasing voltage. The semiconductor switches are used in particular in bridge circuits. A partial charging, for example to 10% of the intermediate circuit voltage supplying the half-bridge, suffices to prevent overvoltages. Thus, for the diode connected in series, it is possible to use a type that has a respectively low admissible reverse voltage and consequentially at the same time a low forward voltage in order to keep its conductive output losses low.

In example embodiments, the circuit configuration is the output stage of an inverter or converter. The advantage in this regard is that the output stage may be arranged as a half-bridge circuit, thus improving the efficiency of the converter or the inverter.

In example embodiments, a diode, in particular a Zener diode or a Schottky diode, is disposed in the main current path, that is, in particular, a diode is connected in series to the semiconductor switch. Preferably the serial diode is arranged as a Schottky diode and/or avalanche-proof, that is, avalanche-rated.

In example embodiments, MOSFET semiconductor switches are used as semiconductor switches. The advantage in this regard is that the serial diode then fulfills an additional function. For the intrinsic diode present in the MOSFET semiconductor switch advantageously does not act as a free-wheeling diode. Instead, the non-intrinsic free-wheeling diode may be provided as a diode having optimized properties.

Among features of the bridge circuit having a circuit configuration are that a half-bride is made up of two series circuits connected in parallel, which respectively have a first and a second circuit part connected in series, a transverse inductance being provided to connect the electrical connection points of the two circuit parts of a particular series circuit, a first circuit part of the first series circuit having a semiconductor switch including a serially connected diode and the second circuit part of the first series circuit having a free-wheeling diode, a first circuit part of the second series circuit having a free-wheeling diode and the second circuit part of the second series circuit having a semiconductor switch including a serially connected diode, the first circuit parts being connected to the higher potential of the supply voltage and the second circuit parts being connected to the lower potential.

It is advantageous in this regard that overvoltages in bridge circuits are avoided because the additional transverse inductance increases the inductance normative for the above-mentioned series resonant circuit such that the amplitude of the ring-back current is decreased. The energy stored in the leakage inductances, which is restored into the drain-source capacitance, is thus also reduced such that the overvoltage is lower. The energy stored in the transverse inductance does not contribute to the overvoltage since it is converted into heat loss by the forward voltages of the free-wheeling diodes and semiconductor switches. This measure alone, that is, without the precharging of the drain-source capacitance, would indeed reduce the occurring overvoltages, but would also increase the conductive output losses in the semiconductor components. If this measure is combined with the precharging of the drain-source capacitance, however, then overvoltages are avoided and conductive output losses are reduced.

LIST OF REFERENCE CHARACTERS $U_z$ intermediate circuit voltage
$C_z$ intermediate circuit capacitor
$HB_1$ half-bridge 1
$S_1/S_2$ upper/lower switch of half-bridge 1
$S_3/S_4$ upper/lower switch of half-bridge 2
$D_{i1}/D_{i2}$ intrinsic diode of S1/S2
$C_{i1}/C_{i2}$ drain-source capacitance of S1/S2
$L_{oS1}/L_{oS2}$ parasitic leakage inductances
$R_L/L_L$ load resistance/load inductance
$D_{S1}/D_{S2}$ upper/lower serial diodes
$D_{F1}/D_{F2}$ upper/lower free-wheeling diode
$U_{H+}/U_{H-}$ positive/negative auxiliary voltage supply
$V_2$ gate driver
$R_{b2}$ base series resistor
$T_2$ charging transistor
$D_{L2}$ charging diode
$L_{L2}$ charging inductance
$R_{g2}$ gate series resistor
$C_{g2}$ gate capacitance
$L_q$ transverse inductance
1 signal electronics
2 control and charging circuit
3 control and charging circuit Example embodiments of the present invention will now be explained in more detail with reference to the Figures.

DETAILED DESCRIPTION

Figure 1:
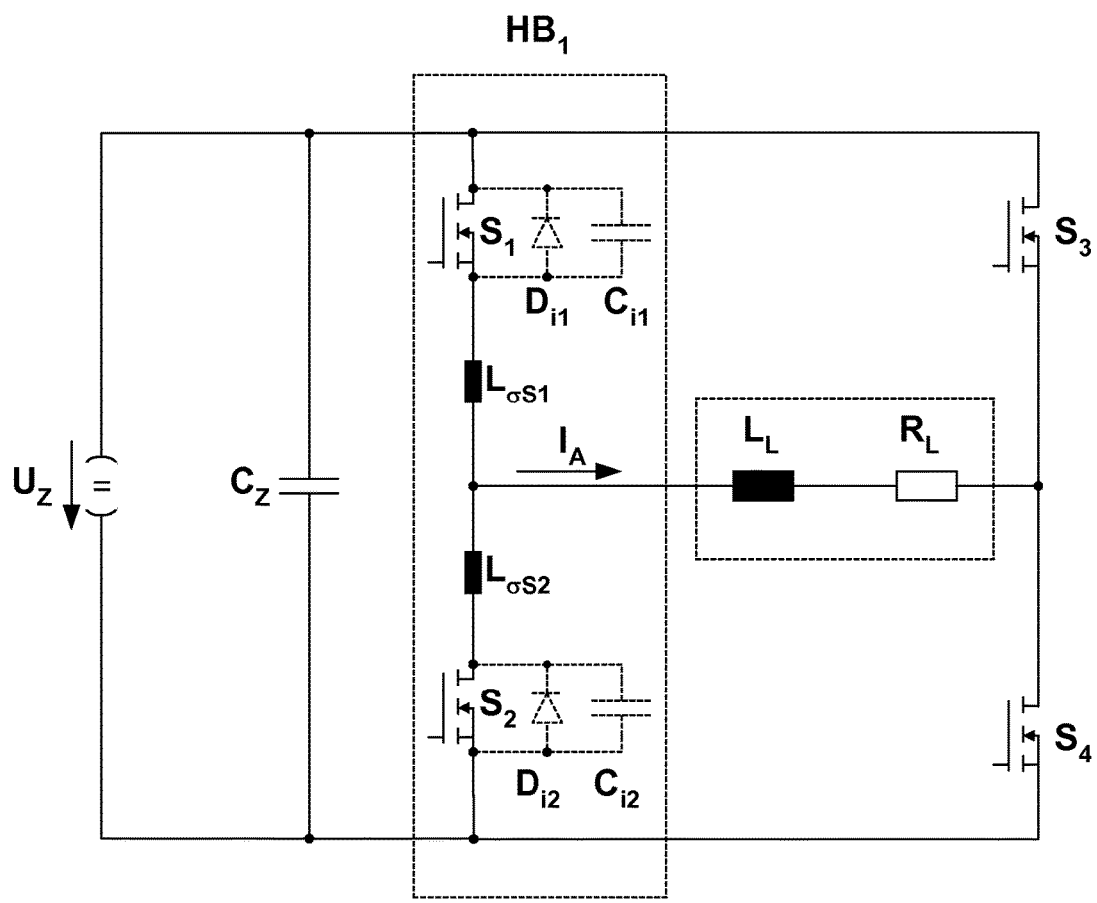
FIG. 1 shows an H-bridge circuit, having two half-bridge branches, including a load suppliable by it, in which example embodiments of the present invention is used.

FIG. 1 shows a bridge circuit having the ohmic-inductive load $R_L$ and $L_L$, which are suppliable from an H-bridge circuit having four MOSFET semiconductor switches ($S_1$, $S_2$, $S_3$, $S_4$). In this instance, half-bridge $HB_1$ is shown with parasitic leakage inductances $L_{oS1}$ and $L_{oS2}$, which are caused by the circuit board construction and/or connecting lines. In addition, drain-source capacitances $C_{i1}$ and $C_{i2}$ of the MOSFET semiconductor switches are shown and also the intrinsic diodes $D_{i1}$ and $D_{i2}$ included in the MOSFET semiconductor switches.

By way of example, the unipolar intermediate circuit voltage $U_z$ smoothed by capacitance $C_z$ is produced by a line rectifier. Alternatively, this voltage is also suppliable by a battery, an accumulator or another module producing direct voltage. The intermediate circuit voltage supplies the half-bridge circuit, which in the first bridge branch has a series circuit, in which an upper semiconductor switch $S_1$ and a lower semiconductor switch $S_2$ are situated, and in the second bridge branch has a series circuit, in which an upper semiconductor switch $S_3$ and a lower semiconductor switch $S_4$ are situated.

In the following, the processes in half-bridge $HB_1$ are described, the same holding for the second half-bridge made up of $S_3$ and $S_4$.

Semiconductor switches S1 and $S_2$ are controlled such that either a first state 1, in which semiconductor switch $S_1$ is open and semiconductor switch $S_2$ is closed, is set, or a second state 2 having the reverse switch positions is set.

In the transition from one state into the other, the initially closed semiconductor switch is always open and only after a so-called dead time is the opposite semiconductor switch closed. This reliably prevents both semiconductor switches from being switched on simultaneously in the transition.

In contrast to IGBT semiconductor switches, MOSFET semiconductor switches have a so-called intrinsic diode ($D_{i1}$, $D_{i2}$), because the junction construction of the MOSFETs necessitates it. These intrinsic diodes, however, have very high reverse recovery times compared to optimized switching diodes and are thus not very suitable as free-wheeling diodes. In a simple buck converter system this would be less problematic since there no current flows across the intrinsic diode. By contrast, the intrinsic diodes in half-bridge HB1, as shown in FIG. 1, act in the known manner as free-wheeling diodes.

In operation, when there is a state change between states 1 and 2, two fundamentally different commutation processes may occur in the half-bridge, depending on the direction in which load current $I_A$ flows at this point in time. Representatively, the change from state 1 to state 2 will be considered, once as Case 1 at a negative load current, that is, one flowing into the half-bridge, and once as Case 2 at a positive load current, that is, one flowing out of the half-bridge:

Case 1:

In the case of a negative load current $I_A$, in state 1, the current flows via the closed semiconductor switch $S_2$ to the negative terminal of supply voltage $U_z$. If the transition to state 2 is now initiated by switching $S_2$ off, then drain-source capacitance $C_{i2}$ is charged by the load current. The load current shall be assumed as constant during the commutation process. If drain-source voltage on $C_{i2}$ reaches the value of the intermediate circuit voltage, then the load current would commutate abruptly and without transient overvoltage to free-wheeling diode $D_{i1}$ if parasitic leakage inductances $L_{oS1}$ and $L_{oS2}$ did not exist. However, since the load current through $L_{oS2}$ cannot diminish abruptly to zero, drain-source capacitance $C_{i2}$ continues to be charged until the energy stored in the leakage inductances has diminished to zero. The resulting overvoltage on $S_2$ is thus a function of the magnitude of the load current, which is operationally limited to defined boundaries, however. Using short conductor lengths in the circuit construction achieves low leakage inductances such that the overvoltages in this situation are controllable. By contrast, in the following Case 2, currents that are many times higher occur in the leakage inductances such that there significant overvoltages may occur even in optimized conditions with respect to the leakage inductances of the circuit construction.

Case 2: For this case it shall be assumed by way of simplification that a very low load current flows such that its influence on the ring-back process may be ignored in the following considerations. A great load current does not imply any fundamental change of the conditions, but may be regarded rather as superposed on the processes described in the following.

In the case of a positive load current, in state 1, the current flows via free-wheeling diode $D_{i2}$ from the negative terminal of the supply voltage to the load. If the transition to state 2 is now initiated in that $S_2$ switches off, then the load current initially continues to flow through $D_{i2}$. The actual commutation process only begins when semiconductor switch $S_1$ is switched on following the expiration of the dead time. Together with $L_{oS1}$ and $L_{oS2}$, drain source capacitance $C_{i2}$ forms a resonant circuit that is connected via $S_1$ to the intermediate circuit voltage. Assuming a constant drain-source capacitance $C_{i2}$, the known sinusoidal current and voltage curve would result, the voltage on the capacitance swinging up to twice the value of the direct voltage of the supply voltage. In actual fact, however, essentially two additional factors influence the magnitude of the overawing, that is, of the transient overvoltage.

First, the switching speed of the switched-on semiconductor switch is merely finite, for example between 10 ns and 200 ns or more, depending on the type of semiconductor switch. Thus the semiconductor switch is operated for a considerable time in its linear range, which is similar to an attenuation of the resonant circuit by an ohmic resistance. The shorter the period duration of the resonance frequency of the resonant circuit in comparison to the switching time of the semiconductor switch, the better the resonant circuit will be attenuated and thus the overvoltage reduced. For this reason, in the construction of the circuit, attention is paid to create a circuit trace routing that is as short as possible and low in inductance. Moreover, this also makes it possible to reduce the transient overvoltage further by deliberately decreasing the switching speed, for example by increasing the gate series resistance in the driver circuit of the gate control. This measure, however, results in rising switching losses.

Second, the drain-source capacitance of the semiconductor switches is not constant, but rather dependent on the voltage. At a low drain-source voltage, the capacitance is markedly higher than at a high voltage. Preferably, a semiconductor switch is used as described in PCT Published Patent Application No. WO 00/16407. The semiconductor switch thus has a particularly high voltage dependence of the drain-source capacitance. This has indeed a positive effect on the switch-off losses as occur in the process described under Case 1. In the present Case 2, however, this fact results in an overawing of the resonant circuit that is many times greater than at a constant capacitance. Due to the high capacitance at a low voltage, the voltage initially rises more slowly, as a result of which a very high current may build up in the leakage inductance. The energy stored in the inductance must subsequently be restored in a decreasing capacitance, however, which causes an accordingly increased overvoltage on the drain-source capacitance.

With the aid of example embodiments of the present invention, the overvoltages for the process in Case 2 are reduced. At the same time, the respective switching losses are reduced.

Figure 2:
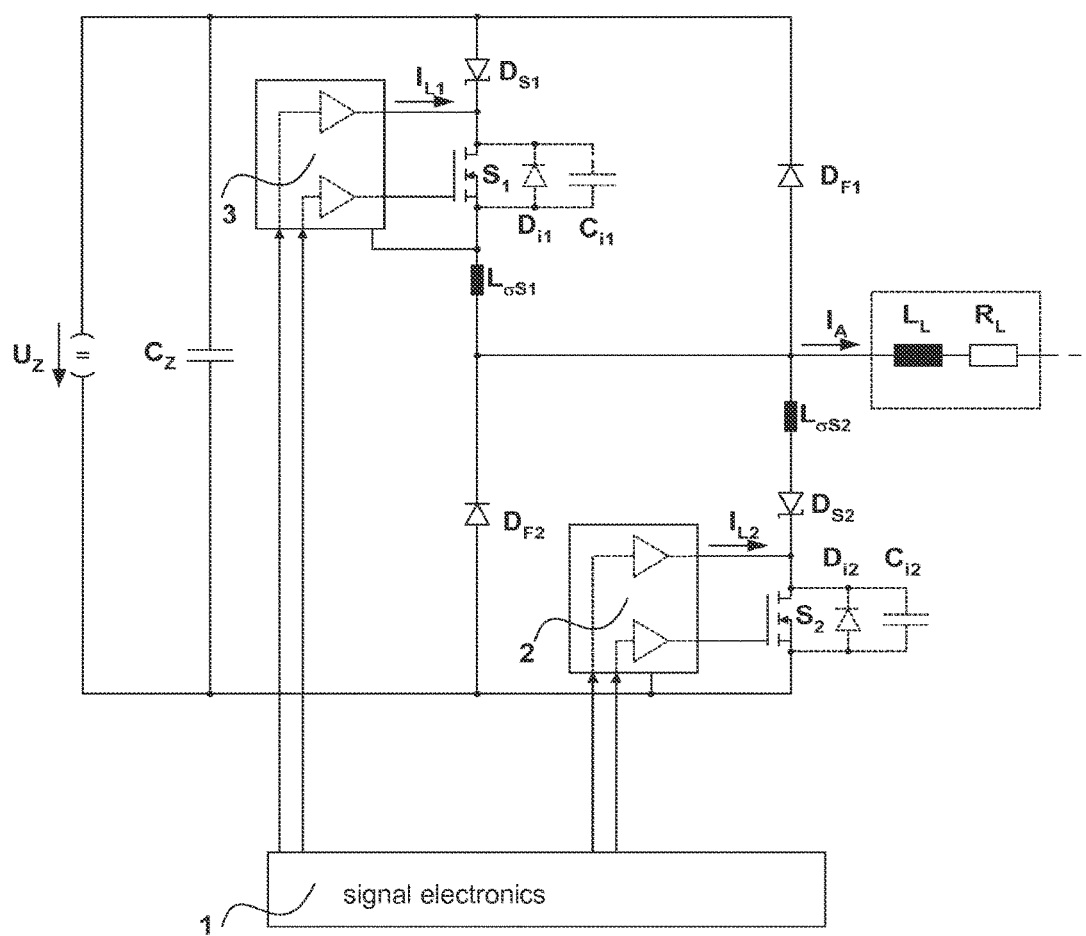
FIG. 2 shows one of the half-bridge branches according to an example embodiment of the present invention, a control and charging circuit being shown as well.
Figure 3:
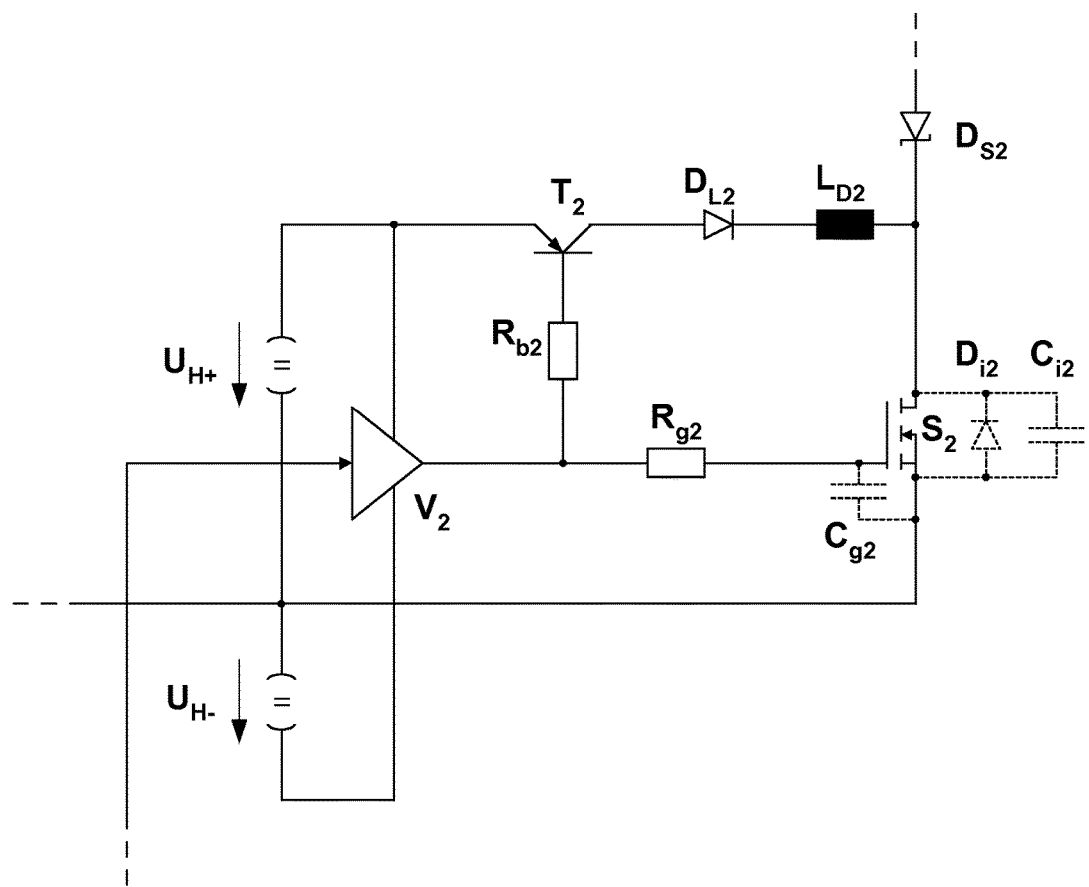
FIG. 3 shows another control and charging circuit according to an example embodiment of the present invention for a semiconductor switch of a half-bridge branch.

The control and charging circuit according to example embodiments of the present invention, as shown in FIG. 2 or 3, makes it possible to charge the drain-source capacitance of the switched-off switch forcibly prior to switching on an opposite switch.

As shown in FIG. 2, to this end, control circuit 2 and 3 is extended such that it includes a charging circuit for precharging the drain-source capacitance of the semiconductor switch.

In exemplary embodiments according to the present invention, this circuit part is supplied by a low auxiliary voltage, which is lower than 50 V, for example 24 volts. Ideally, this auxiliary voltage is the same as that from which the control circuit of the gate control is supplied.

FIG. 2 shows an example embodiment, in which the circuit parts, that is, the charging circuit for precharging and the gate control circuit, are controlled by separate signals from a signal electronics 1 that generates control signals.

Second, according to example embodiments of the present invention, a diode $D_{S1}$ and $D_{S2}$ is respectively disposed in series to the semiconductor switch. Diode $D_{S1}$ and $D_{S1}$ prevents charging current $I_{L1}$ and $I_{L2}$ from draining off via free-wheeling diodes $D_{F1}$ and $D_{F2}$, respectively, even when at the time of the charging process the parallel free-wheeling diodes carry the load current and are thus conductive.

If MOSFETs are provided as semiconductor switches, then at the same time their intrinsic diodes are ineffective as free-wheeling diodes since, instead of the intrinsic diodes, separate free-wheeling diodes $D_{F1}$ and $D_{F2}$ having an optimized switching behavior are provided. When using MOSFET semiconductor switches, diodes $D_{S1}$ and $D_{S2}$ respectively fulfill a dual purpose since they create the possibility of allowing both for a forcible charging of the drain-source capacitance as well as for using optimized free-wheeling diodes. The blocking capacity of diodes $D_{S1}$ and $D_{S2}$ must be selected in accordance with the specified charging.

In exemplary embodiments according to the present invention, a semiconductor switch is used, the drain-source capacitance of which diminishes greatly with increasing voltage. The advantage in this regard is that charging to a relatively low voltage suffices to prevent overvoltages, and hence serial diodes $D_{S1}$ and $D_{S2}$ may be used that have a low blocking capacity and thus likewise a low forward voltage.

In exemplary embodiments according to the present invention, the control of the charging circuit is derived from the signal of the gate control. The advantage in this regard is that only one signal has to be conducted in a potential-separating manner. An exemplary combination of the control and charging circuit for switch $S_2$ is shown in a simplified manner in FIG. 3. The indicated gate driver $V_2$ is supplied by an auxiliary supply voltage $U_{H+}$ and $U_{H-}$ that is bipolar with respect to the source potential. The gate driver expediently includes a potential separation with respect to signal electronics 1 from FIG. 2, which generates the control signals.

The gate of semiconductor switch $S_2$ is controlled via gate series resistance $R_{g2}$. $C_{g2}$ indicates the internal gate capacitance of switch $S_2$. This circuit part corresponding to the related art is now extended by a circuit part according to example embodiments of the present invention made up of base resistance $R_{b2}$, charging transistor $T_2$, charging diode $D_{L2}$, charging inductance $L_{L2}$ in combination with serial diode $D_{S2}$. If the output voltage of gate drive $V_2$ changes from $U_{H+}$ to $U_{H-}$, which is similar to $S_2$ being switched off, then at the same time charging transistor $T_2$ is switched on since now only a base current is able to flow through $R_{b2}$. Via $T_2$ and $D_{L2}$, auxiliary voltage $U_{H+}$ is now applied on the series circuit made up of $L_{D2}$ and $C_{j2}$. A charging process now occurs that proceeds according to the same law as the ring-back process described at the outset, from which the transient overvoltage results in Case 2. Advantageously, when using this type of charging circuit, a semiconductor switch $S_2$ having a highly voltage-dependent drain-source capacitance may also be used. A relatively low auxiliary voltage supply in combination with a switched charging inductance then suffices to precharge the drain-source capacitance to far above twice the auxiliary voltage supply $U_{H+}$ and thus to charge it sufficiently. Charging diode $D_{L2}$ prevents the charging current from swinging back. The value of the inductance of $L_{L2}$ is dimensioned such that within the dead time, that is, prior to switching on the opposite semiconductor switch $S_1$, a sufficiently high precharge is achieved. The lower the selected charging inductance, the higher will be the charging current and the faster the charging process will be concluded.

Figure 4:
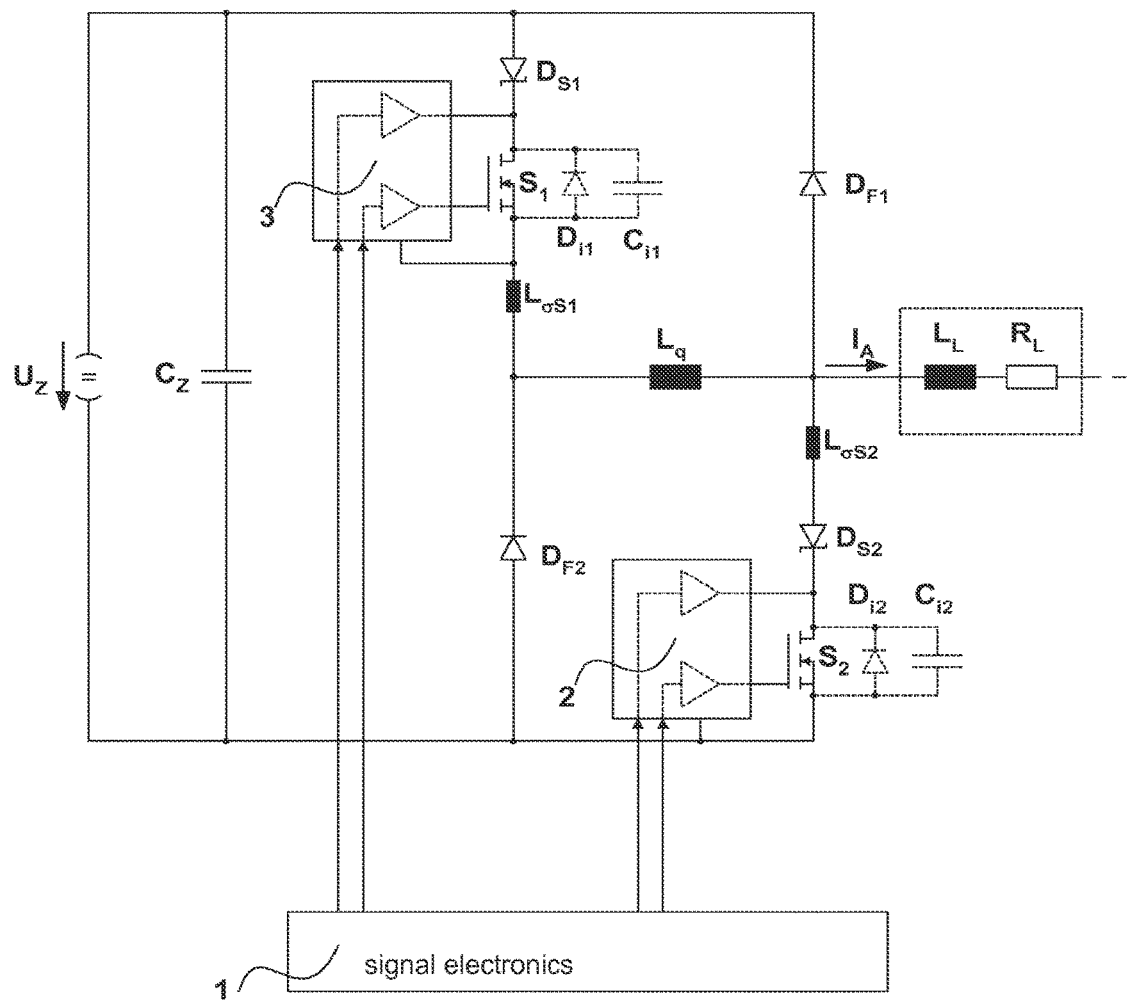
FIG. 4 shows a circuit configuration according to an example embodiment of the present invention further arranged by a transverse inductance.

An example embodiment is shown in FIG. 4. In this instance, a bridge branch is separated into two circuit parts and connected by a transverse inductance $L_q$. The first circuit part contains upper switch $S_1$ including serial diode $D_{S1}$ and lower free-wheeling diode $D_{F2}$. The second circuit part contains lower switch $S_2$ including serial diode $D_{S2}$ and upper free-running diode $D_{F1}$. The additional transverse inductance increases the inductance normative for the above-mentioned series resonant circuit such that the amplitude of the ring-back current is reduced. The energy stored in the leakage inductances, which is restored into the drain-source capacitances, is thus also reduced such that the overvoltage is lower. The energy stored in the transverse inductance does not contribute to the overvoltage. When the voltage on the semiconductor switch reaches the intermediate circuit voltage, the ring-back current in $L_q$ superposed on the output current commutates into one of free-wheeling circuits $D_{S1}$-$S_1$-$L_{oS1}$-$D_{F1}$ and $D_{S2}$-$S_2$-$L_{oS2}$-$D_{F2}$, respectively, and is there converted to heat loss by the forward voltages of the free-wheeling diodes and semiconductor switches. This measure by itself reduces the occurring overvoltages, but increases the conductive output losses in the semiconductor elements. If this measure is combined with the above-described precharging method, however, then overvoltages are avoided and conducting output losses are reduced since the ring-back current in $L_q$ is reduced by the precharging process described above. An extremely low inductance, for example 500 nH, already suffices as a transverse inductance. This corresponds to a value that amounts to a multiple of the usual parasitic inductances of the conductor routing, which suffices for the described mechanism of action. The component size is thus extremely small.

In all exemplary embodiments, one must be mindful of the fact that the higher the voltage to which the drain-source capacitance is precharged, the lower will be the subsequent transient overvoltage. Here one must consider that even a precharging to a relative low voltage already greatly reduces the subsequent transient overvoltage. In the MOSFET semiconductor switch from FIG. 3, a precharging to 50 V to 100 V may be regarded as sufficient for example, the intermediate circuit voltage supplying the half-bridge being at 400 V to 600 V. The reason for this is that from 100 V onward the drain-source capacitance has a low value.

The invention claimed is:

1. A method for charging a capacitance that is present on main current terminals of a semiconductor switch, the semiconductor switch including at least one of (a) a MOSFET semiconductor switch and (b) an IGBT semiconductor switch, the capacitance including at least one of (a) a drain-source capacitance of the MOSFET semiconductor and (b) a collector-emitter capacitance of the IGBT semiconductor switch, comprising:
   forcibly controlling a precharging of the capacitance via a charging current path;
   wherein a diode is serially arranged in a main current path of the semiconductor switch to form a series circuit, and a free-wheeling diode is connected in parallel to the series circuit; and
   wherein the charging current path includes an inductance, and a control semiconductor switch is provided in the charging current path, the inductance and the capacitance forming a series resonant circuit, such that the precharging includes precharging of the capacitance to a higher voltage level than a supply voltage.

2. The method according to claim 1, wherein the precharging includes at least partial charging.

3. The method according to claim 1, wherein the precharging is forcibly controlled by a control signal of the semiconductor switch via the charging current path.

4. The method according to claim 1, wherein an energy for charging is not taken from a main current path.

5. The method according to claim 1, wherein at least one of (a) a diode, (b) a Zener diode, and (c) a Schottky diode is disposed in a main current path.

6. The method according to claim 1, wherein a converter includes signal electronics, and wherein the charging current path is supplied by a same voltage source, from which a driver circuit for producing a control current for the control terminal of the semiconductor switch is supplied and the voltage source is electrically isolated from the signal electronics of the converter.

7. The method according to claim 1, wherein the semiconductor switch is situated in a bridge branch of a bridge circuit.

8. The method according to claim 1, wherein the precharging is at least partially performed at least one of (a) during a dead time and (b) during a period in which both semiconductor switches of a half-bridge of a bridge circuit are switched off.

9. The method according to claim 1, wherein a charging current is already built up in the charging current path, while the semiconductor switch to be switched off is still in a conductive state.

10. The method according to claim 1, wherein the inductance is dimensioned such that the series resonant circuit swings up to a voltage desired as a precharge, reaching a maximum of an upswing of the voltage within a dead time.

11. A circuit configuration, comprising:
   a semiconductor switch, including at least one of (a) a MOSFET semiconductor switch and (b) an IGBT semiconductor switch; and
   a capacitance that is present on main current terminals of the semiconductor switch, the capacitance including at least one of (a) a drain-source capacitance of the MOSFET semiconductor switch and (b) a collector-emitter capacitance of the IGBT semiconductor switch;
   wherein for at least one of (a) precharging and (b) at least partial charging, of the capacitance, a charging current path is provided via which the precharging is forcibly controlled;
   wherein a diode is serially arranged in a main current path of the semiconductor switch to form a series circuit, and a free-wheeling diode is connected in parallel to the series circuit; and
   wherein the charging current path includes an inductance, and a control semiconductor switch is provided in the charging current path, the inductance and the capacitance forming a series resonant circuit adapted to precharge the capacitance to a higher voltage level than a supply voltage.

12. The circuit configuration according to claim 11, wherein the capacitance diminishes with increasing voltage.

13. The circuit configuration according to claim 11, wherein the diode is oriented antiparallel with respect to the free-wheeling diode.

14. The circuit configuration according to claim 11, wherein a voltage of the capacitance achieved by precharging reaches at least one of (a) less than 30% and (b) less than 15% of a voltage switchable by the semiconductor switch.

15. A bridge circuit, comprising:
   a circuit configuration including:
      a semiconductor switch, including at least one of (a) a MOSFET semiconductor switch and (b) an IGBT semiconductor switch; and
      a capacitance that is present on main current terminals of the semiconductor switch, the capacitance including at least one of (a) a drain-source capacitance of the MOSFET semiconductor switch and (b) a collector-emitter capacitance of the IGBT semiconductor switch;
   wherein for at least one of (a) precharging and (b) at least partial charging, of the capacitance, a charging current path is provided via which the precharging is forcibly controlled;
   wherein the charging current path includes an inductance, the inductance and the capacitance forming a series resonant circuit adapted to precharge the capacitance to a higher voltage level than a supply voltage;
   wherein a half-bridge includes a first and a second series circuit connected in parallel, which respectively have a first and a second circuit part connected in series, a transverse inductance being provided to connect electrical connection points of the first and second circuit parts of a particular series circuit;
   wherein the first circuit part of the first series circuit includes the semiconductor switch including a serially connected diode and the second circuit part of the first series circuit includes a first free-wheeling diode connected in parallel to the first series circuit;
   wherein a first circuit part of the second series circuit includes a second free-wheeling diode connected in parallel to the second series circuit and the second circuit part of the second series circuit includes an additional semiconductor switch including a serially connected diode; and
   wherein the first circuit parts are connected to a higher potential of a supply voltage and the second circuit parts are connected to a lower potential.

* * * * *